United States Patent [19]

Chrepta

[11] Patent Number: 4,718,746
[45] Date of Patent: Jan. 12, 1988

[54] OPTICAL FIBER GRADED INDEX CONNECTOR

[75] Inventor: Metro M. Chrepta, Neptune, N.J.

[73] Assignee: The United States of America as represented by the Secretary of the Army, Washington, D.C.

[21] Appl. No.: 432,224

[22] Filed: Oct. 1, 1982

[51] Int. Cl.⁴ .............................................. G02B 6/38
[52] U.S. Cl. .............................. 350/96.21; 350/96.18
[58] Field of Search .................... 350/96.18, 96.21, 413

[56] References Cited

U.S. PATENT DOCUMENTS

| | | | |
|---|---|---|---|
| 3,944,327 | 3/1976 | Larsen | 350/96.21 |
| 4,268,112 | 5/1981 | Peterson | 350/96.18 |
| 4,290,667 | 9/1981 | Chown | 350/96.18 |
| 4,362,356 | 12/1982 | Williams et al. | 350/96.20 |
| 4,400,053 | 8/1983 | Kazkaz | 350/96.15 |
| 4,451,115 | 5/1984 | Nicia et al. | 350/96.18 |

*Primary Examiner*—William L. Sikes
*Assistant Examiner*—Frank González
*Attorney, Agent, or Firm*—Sheldon Kanars; Jeremiah G. Murray; Edward Goldberg

[57] ABSTRACT

An optical fiber graded index connector wherein a graded index rod is employed having a bore extending along the longitudinal axis thereof, the ends of the optical fibers to be connected being inserted into opposite ends of the rod bore and positioned to a focal length until a maximum power output is detected at the required destination for which the connection is made.

1 Claim, 6 Drawing Figures

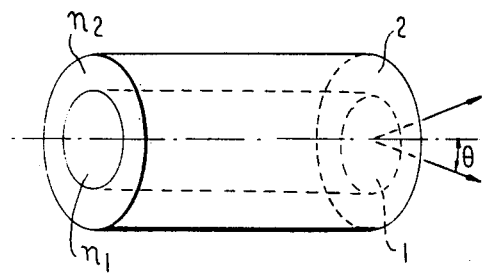
FIG.1
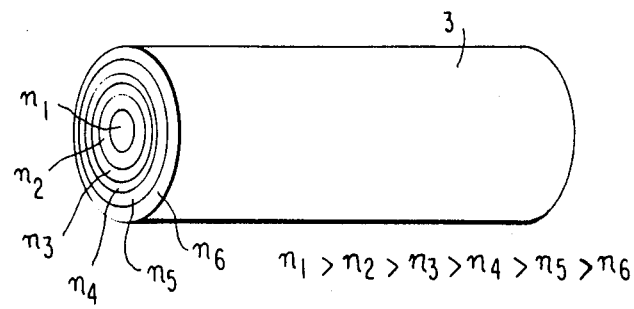
FIG.2
$n_1 > n_2 > n_3 > n_4 > n_5 > n_6$
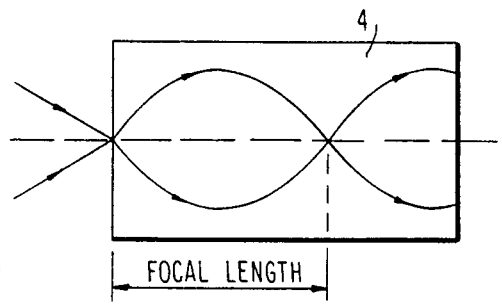
FIG.3 FOCAL LENGTH
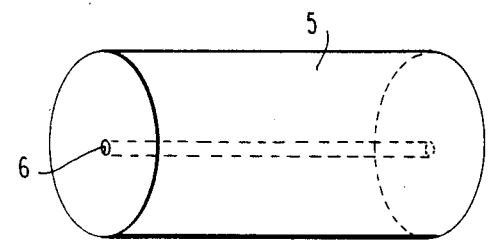
FIG.4
FIG.5
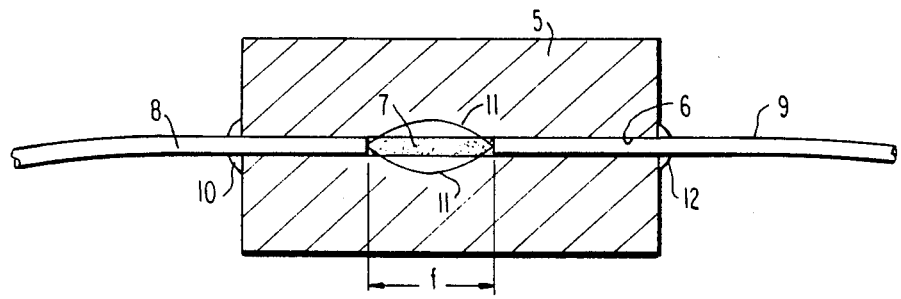
FIG.6
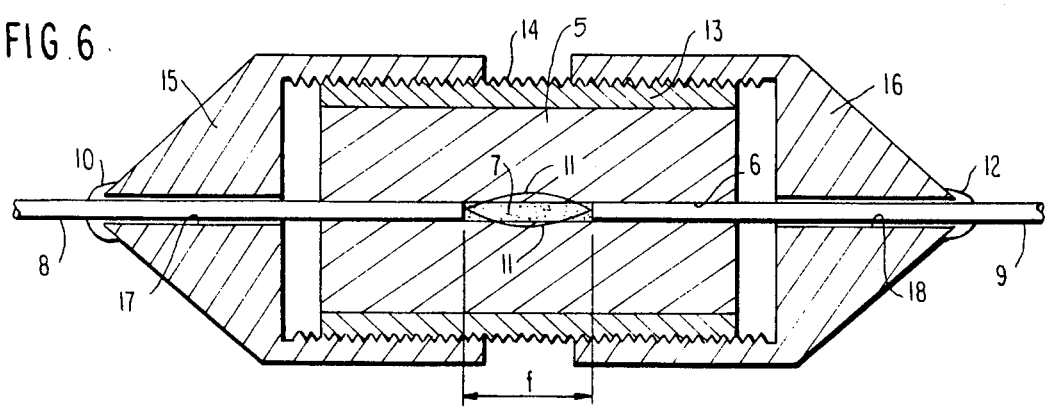

OPTICAL FIBER GRADED INDEX CONNECTOR

The invention described herein may be manufactured, used and licensed by or for the Government for Governmental purposes without the payment to me of any royalties thereon.

BACKGROUND OF THE INVENTION

This invention relates generally to fiber optics and more particularly to a connector for coupling or splicing optical fibers end-to-end wherein the fibers are easily brought together for continuous light transmission.

Various connectors have been proposed for coupling optical fibers end-to-end. These connectors either have been of a permanent nature forming a splice between the optical fibers; or they have been of a mechanical nature employing male and female coupling components providing a disconnectable butt connection. These connectors have often required the use of precision micromanipulators or microscopes to affect the connection since the diameter of an optical fiber is usually in the range of 10 to 500 microns.

After considerable research and experimentation, the connector of the present invention has been devised which can be employed either as a permanent splice between the ends of aligned optical fibers or it can be employed as a disconnectable connector between the fiber ends. The connector of the present invention is constructed and arranged to be a low cost, low loss connector or splicer for use in the field and thus not requiring precise instruments to facilitate the connection or splice.

The connector of the present invention comprises, essentially, a graded index rod having a longitudinally extending bore extending along the longitudinal axis thereof. The ends of the optical fibers to be connected are inserted into opposite ends of the rod bore and positioned to a focal length until a maximum power output is detected at the required destination for which the connection is made. A suitable adhesive is provided for holding the ends of the optical fibers within the rod bore, whereby the connection can be made and disconnected many times, as desired. A permanent cement is employed when splicing the optical fibers together.

The graded index rod can be inserted within and secured to a sleeve having a threaded outer wall. A cap having an axially extending bore aligned with the rod bore is threaded on each end of the sleeve, and the fibers to be connected extend through a respective cap bore and into the rod bore. The optical fibers are adhesively connected to the caps, whereby adjustment of the fiber spacing to the desired focal length is accomplished by rotation of the end caps relative to the sleeve.

BRIEF DESCRIPTION OF THE DRAWINGS

FIG. 1 is a diagrammatic perspective view illustrating a step index optical fiber;

FIG. 2 is a diagrammatic perspective view illustrating a graded index fiber;

FIG. 3 is a diagrammatic view of a graded index fiber rod illustrating light being focused on one end of the rod and the propagation of the light through the rod;

FIG. 4 is a perspective view of the connector of the present invention;

FIG. 5 is a sectional side elevational view of the connector of the present invention in operative position connecting or splicing a pair of optical fibers; and FIG. 6 is a sectional side elevational view of another embodiment of the connector of the present invention.

DESCRIPTION OF THE PREFERRED EMBODIMENTS

Since light transmission via optical fibers is well known to those skilled in the art, it will suffice to only mention the types of optical fiber employed today, and a few basic parameters associated with these fibers for a complete understanding of the connector of the present invention.

Referring to FIG. 1, a clad optical fiber is shown consisting of a glass core 1 having either a plastic or glass cladding 2. The indices of refraction for the core and cladding are represented by $n_1$ and $n_2$, respectively, the index of refraction of the cladding being less than that of the core. The values of $n_1$ and $n_2$ determine the acceptance or exit angle $\theta$ of the fiber, referred to as the numerical aperture. If the core 1 is provided with a glass cladding, the index of refraction $n_2$ would be lower than that of plastic cladding and the fiber would have a different numerical aperture. The various indices of refraction $n_2$ provided by different claddings relative to the index of refraction $n_1$ of the glass core is referred to as the index profile of the fiber and is called step index.

FIG. 2 illustrates a graded index fiber 3 wherein the fiber configuration is fabricated with a graded index decreasing outwardly radially so that the index of refraction $n_1$ of the core is greater than the index of refraction $n_2$ of the next adjacent layer, which is greater than the index of refraction $n_3$ of the next adjacent layer and so on. This type of fiber has a self-focusing feature which concentrates the light propagating around the shortest path closest to the center of the fiber.

The graded index technique used in the fiber shown in FIG. 2 is also employed in a rod 4 shown in FIG. 3, which is much larger in diameter than a fiber. This rod forms a lens having a focal length according to approximately the average difference of the maximum and minimum refractive index along the radius, and the wave length of the light. Light focused on one end of the rod will be coupled into the rod and propagates therethrough as shown in FIG. 3. When such a rod lens is used to butt connect two fiber ends, the length of the rod lens is critical for coupling at the most efficient point along the axis, the focal point. Furthermore, to accomplish the connection, a very precise position manipulator and/or microscope are required in order to make the fiber end surfaces abutting the rod end surfaces compatible.

In order to overcome the above-noted disadvantages experienced with the graded index fiber rod, the cylindrical connector of the present invention has been devised, as shown in FIG. 4, wherein a graded index rod 5 similar to the rod shown in FIG. 3 is formed with a longitudinally extending bore 6 extending along the longitudinal axis thereof. The connector is dimensioned to have a length from 0.5 cm to 1.0 cm, a maximum diameter of 2 mm and a maximum bore diameter of 100 microns.

As will be seen in FIG. 5, the bore 6 is filled with gel 7 to serve as a protective agent against dirt or foreign matter during storage and handling; the gel 7, being an index matching gel, also reduces the fresnel reflections at the fiber faces when the fibers 8 and 9, to be connected, are inserted into opposite ends of the bore 6. As the fibers 8 and 9 are inserted into the bore 6, the gel 7 is squeezed around the end portions of the fibers to form a cushion against vibration, as well as a waterproof connection.

The acceptance angle of the graded cylinder 5 should be equal to or greater than the acceptance angle of the fibers 8 and 9 for maximum coupling efficiency. In the case of step index fiber having a plastic cladding, as described above in connection with FIG. 1, the highest index of the graded index cylinder 5 would be equal to the fiber core index and the gel would have the same index of refraction. In the case of step index fiber having a glass cladding, as described hereinabove in connection with FIG. 1, and the graded index fiber, as described hereinabove in connection with FIG. 2, the highest refractive index at the radius of the bore 6 of the graded index cylinder 5 would be equal to the high core index of refraction of the fibers.

To maximize the coupling efficiency, one fiber, such as 8, is manually inserted into one end of the bore 6 and adhesively secured to the graded cylinder 5 as at 10. The other fiber 9 is inserted into the other end of the bore 6 and positioned along the longitudinal axis to a prescribed focal length f or pushed in and out relative to the end of fiber 8 until a maximum power or light intensity is detected at the required destination for which the connection is made, the light path through the connector being indicated at 11. The fiber 9 is then secured to the connector by a suitable adhesive 12. This procedure places the ends of the fibers 8 and 9 at the focal point of the graded index rod lens 5 and yields maximum coupling and low loss.

It will be appreciated by those skilled in the art that this connection may be made and disconnected several times without requiring a precision micromanipulator or microscope and may be accomplished in the field. For a splice, the adhesive 10 and 12 will consist of a more permanent cement for holding the fibers 8 and 9 in position. The assembly can then be coated with parafin or other cement for total coverage and protection.

To facilitate the connection of the fibers, as will be seen in FIG. 6, the graded cylinder 5 can be inserted into and rigidly secured to a sleeve 13 having a threaded outer wall 14. A pair of caps 15 and 16 having axially extending bores 17 and 18, respectively, aligned with the cylinder bore 6 are threadably mounted on respective ends of the sleeve 14. The fibers 8 and 9 to be connected are inserted into the cap bores 17 and 18, and into the cylinder bore 6, and adhesively secured as at 10 and 12 to the caps. Adjustment of the fiber ends to the proper focal length is accomplished by rotation of the caps 15 and 16 on the sleeve 14.

Having thus shown and described what is at present considered to be the preferred method of fabrication and the resulting structure thereof, it should be noted that the foregoing has been made by way of illustration and not limitation and accordingly all modifications, alterations and changes coming within the spirit and scope of the invention as set forth in the appended claims are herein meant to be included.

What is claimed is:

1. An optical fiber graded index connector comprising: a graded index cylindrical rod, a longitudinal fiber receiving bore extending through said rod along the longitudinal axis thereof, a pair of optical fibers to be connected being positioned within opposite ends of said bore, the end faces of said optical fibers being spaced from each other and positioned at a focal length at which a maximum light intensity is provided at the required destination for which the connection is made, a refractive index matching gel between said end faces having the same index of refraction as the highest index of said rod and equal to the core index of said fibers, said gel filling said bore against foreign matter and reducing the fresnel reflection at the fiber faces, a concentric cylindrical sleeve surrounding and rigidly secured to the outer wall of said rod, said sleeve having a threaded outer wall, and a pair of caps threadably mounted over and engaging respective ends of said sleeve, each cap having an axially extending fiber receiving bore aligned with said rod bore, said optical fibers extending through said cap bores into said rod bore, each of said fibers being adhesively secured to respective said caps, each cap being rotatable on said sleeve to adjustably position said fibers in said rod bore to the desired focal length spacing between respective fiber ends.

* * * * *